United States Patent [19]
Kravitz et al.

[11] Patent Number: 5,545,088
[45] Date of Patent: Aug. 13, 1996

[54] TELEVISION GAME INTERACTIVELY PLAYED BY TELEPHONE WITH TELEVISION-VIEWING HOME AUDIENCE

[76] Inventors: Edward A. Kravitz, 8700 25th Ave., Brooklyn, N.Y. 11214; Jerome H. Kravitz, 6600 Hillandale Rd., Chevy Chase, Md. 20815

[21] Appl. No.: 436,733

[22] Filed: May 8, 1995

[51] Int. Cl.[6] ............................... A63F 9/22; A63F 9/00; H04M 11/00
[52] U.S. Cl. ................. 463/40; 463/41; 463/22; 463/9; 463/19; 379/92; 379/93; 273/429; 273/431
[58] Field of Search ....................... 273/269, 274, 273/138 A, 139, 429–431, 439; 364/410, 412; 379/91–93, 97, 101

[56] References Cited

U.S. PATENT DOCUMENTS

| | | | |
|---|---|---|---|
| 4,815,741 | 3/1989 | Small | 273/439 |
| 4,842,278 | 6/1989 | Markowicz | 273/138 A |
| 4,922,522 | 5/1990 | Scanlon | 273/138 A |
| 4,969,183 | 11/1990 | Reese | 273/138 A |
| 4,996,705 | 2/1991 | Entenmann et al. | 364/412 |
| 5,054,787 | 10/1991 | Richardson | 364/412 |
| 5,069,453 | 12/1991 | Koza et al. | 273/138 A |
| 5,083,272 | 1/1992 | Walker et al. | 364/412 |
| 5,108,115 | 4/1992 | Berman et al. | 273/439 |
| 5,213,337 | 5/1993 | Sherman | 273/439 |
| 5,255,925 | 10/1993 | Small | 273/439 |
| 5,259,023 | 11/1993 | Katz | 379/92 |
| 5,283,734 | 2/1994 | Von Kohorn | 364/412 |
| 5,297,802 | 3/1994 | Pocock et al. | 273/439 |
| 5,327,485 | 7/1994 | Leaden | 273/138 A |
| 5,351,970 | 10/1994 | Fioretti | 273/439 |
| 5,354,069 | 11/1994 | Guttman et al. | 273/439 |
| 5,415,416 | 5/1995 | Scagnelli et al. | 273/439 |

FOREIGN PATENT DOCUMENTS

87/00375  1/1987  WIPO ........................ 379/92

Primary Examiner—Jessica J. Harrison
Assistant Examiner—Mark Sager
Attorney, Agent, or Firm—Goodman & Teitelbaum, Esqs.

[57] ABSTRACT

A television game show is interactively played by the studio participant game players, the television studio audience and by telephone with the television-viewing home audience, where a set of numbers are disposed on a master board positioned on the studio stage, the numbers in the set correspond to a specified portion of the telephone numbers of the home audience, and a predetermined number of game boards are used in association with the set of numbers on the master board for playing the game. Each game board includes a matrix of five rows and five columns to provide twenty-five squares, each square containing a number corresponding to a number on the master board. The numbers on the master board are selected by chance, and the selected number is indicated in the square of the game board having that particular number. Alternatively, the numbers on the master board are selected by the game players, and indicated in the square of the game board of the game player after correctly answering a question. The game is finished when one game board registers a win by having a consecutive horizontal, vertical or diagonal line of squares containing the selected numbers therein. The game player having the winning game board is a winner, and the members of the studio audience previously assigned the winning game board are also winners. All members of the home audience having any one of the numbers, as the specified part of their telephone numbers, in the winning line of squares are eligible to win.

20 Claims, 4 Drawing Sheets

FIG. 1

| 20 | 22 | 24 | 26 |
|----|----|----|----|
| 01 | 26 | 51 | 76 |
| 02 | 27 | 52 | 77 |
| 03 | 28 | 53 | 78 |
| 04 | 29 | 54 | 79 |
| 05 | 30 | 55 | 80 |
| 06 | 31 | 56 | 81 |
| 07 | 32 | 57 | 82 |
| 08 | 33 | 58 | 83 |
| 09 | 34 | 59 | 84 |
| 10 | 35 | 60 | 85 |
| 11 | 36 | 61 | 86 |
| 12 | 37 | 62 | 87 |
| 13 | 38 | 63 | 88 |
| 14 | 39 | 64 | 89 |
| 15 | 40 | 65 | 90 |
| 16 | 41 | 66 | 91 |
| 17 | 42 | 67 | 92 |
| 18 | 43 | 68 | 93 |
| 19 | 44 | 69 | 94 |
| 20 | 45 | 70 | 95 |
| 21 | 46 | 71 | 96 |
| 22 | 47 | 72 | 97 |
| 23 | 48 | 73 | 98 |
| 24 | 49 | 74 | 99 |
| 25 | 50 | 75 | 00 |

| ↓20 | ↓22 | ↓24 | ↓26 |
|---|---|---|---|
| 01 | 26 | 51 | 76 |
| 02 | 27 | 52 | 77 |
| 03 | 28 | 53 | 78 |
| 04 | 29 | 54 | 79 |
| 05 | 30 | 55 | 80 |
| 22 | 47 | 72 | 97 |
| 23 | 48 | 73 | 98 |
| 24 | 49 | 74 | 99 |
| 25 | 50 | 75 | 00 |
| LOSE TURN | LOSE TURN | LOSE TURN | LOSE TURN |
| LOSE SQUARE | LOSE SQUARE | LOSE SQUARE | LOSE SQUARE |
| CHOOSE SQUARE | CHOOSE SQUARE | CHOOSE SQUARE | CHOOSE SQUARE |
| QUESTION | QUESTION | QUESTION | QUESTION |

FIG. 4

TELEVISION GAME INTERACTIVELY PLAYED BY TELEPHONE WITH TELEVISION-VIEWING HOME AUDIENCE

BACKGROUND OF THE INVENTION

The invention relates to a game and the method of playing same, and more particularly, to a television game show in which a game is interactively played by the studio participant game players, the television studio audience and the television-viewing home audience, the home audience participating through the use of the television media coacting with the telephone media, in which all participating groups of players are eligible winners to be awarded prizes.

The game of the present invention is a variant of the well know prior art game known as bingo. The prior art bingo game is usually played in a confined area, such as a large hall or auditorium, where only the individuals present in the hall or auditorium can participate in the playing of the game. In addition to the audience players, there is usually a host who selects the numbers and informs the audience players thereof. Additional personnel is usually required to verify the winning game board or card and to award the prizes to the winning players.

In recent years, television has been used in lotto games administered by particular states in the United States, where the television-viewing home audience can view the random selection of the winning lotto numbers. However, there is no interaction between the televised selection of the lotto numbers and the home audience, where the television show merely allows the home audience to view the random selection of the winning lotto numbers. Furthermore, the television show is only directed to those particular members of the home audience who have previously purchased a lotto ticket bearing their selected lotto numbers thereon. Accordingly, the winning lotto players must contact the administrators of the lotto game in person in order to collect their cash prizes.

Accordingly, there is presently a need for a television game that allows the television-viewing home audience to participate therein through the use of the telephone media so that all the members of the television-viewing audience can be eligible winners, where the number of eligible winners is not restricted to only one television-viewing household, that permits the winners to be determined solely by chance, where there is no fee or charge to the telvision-viewing home audience for participating in the television game, and where the studio participant game players and the television studio audience can also interactively play the television game.

SUMMARY OF THE INVENTION

It is accordingly an object of the present invention to provide a television game which avoids the problems and deficiencies of the prior art television games.

Another object of the present invention is to provide a television game, which is interactively played by the studio participant game players, the television studio audience and the television-viewing home audience.

A further object of the present invention is to provide a television game, which permits the television-viewing home audience to participate through the use of the television media coacting with the telephone media.

Another object of the present invention is to provide a television game, which permits all participating players including the studio game players, the studio audience and the television-viewing home audience to be eligible to win and to be awarded prizes.

Yet another object of the present invention is to provide a television game, which allows all of the members of the television-viewing home audience to be potential winners, where the number of potential winners is not restricted.

A further object of the present invention is to provide a television game, where the winning thereof is basically determined by chance in which the winning members are not prestructured or predetermined.

Another object of the present invention is to provide a television game, where there is no cost or fee charged to the participating players, or to the winners of the game.

A further object of the present invention is to provide a television game, which provides a set of numbers preferably disposed on a master board, the numbers in the set corresponding with portions of the telephone numbers of the television-viewing home audience.

A further object of the present invention is to provide a television game, which provides game boards having numbers thereon representing portions of the telephone numbers of the television-viewing home audience, where the numbers awarded to the game boards are randomly selected from the set of numbers disposed on the master board.

Yet another object of the present invention is to provide a television game, where the numbers awarded to the game boards are selected from the master board by the studio participant game players.

And still a further object of the present invention is to provide a television game, which is entertaining, exciting and awarding to the studio participant game players, the television studio audience and the television-viewing home audience, which embodies a format specific to television broadcasting.

Briefly, in accordance with the present invention, a television game show is interactively played by the studio participant game players, the television studio audience and by telephone with the television-viewing home audience, where a set of numbers are disposed on a master board positioned on the studio stage, the numbers in the set correspond to a specified portion of the telephone numbers of the television-viewing home audience, and a predetermined number of game boards are used in association with the set of numbers on the master board for playing the game.

Each game board includes a matrix of five rows and five columns to provide twenty-five squares, each square containing a number corresponding to a number on the master board. The game is played by having the numbers on the game boards selected by chance, either one at a time or in multiple sets, with the selected numbers appearing on the appropriate game board. Alternatively, the numbers on the master board are selected by the game player, and indicated in the square of the game board of the game player. In either case, or in combination, the number can be awarded to the game player who has correctly answered a question given by the game host.

The game is finished when one of the game boards registers a win, the win being defined by the winning game board having a consecutive horizontal, vertical or diagonal line of squares containing the selected numbers therein. The game player having the winning game board is a winner, and the members of the studio audience previously assigned the winning game board are also winners. All household members of the television-viewing home audience having a preselected portion of their telephone number the same as any one of the numbers in the consecutive horizontal, vertical or diagonal line of squares on the winning game board are eligible to win, and only a predetermined portion thereof can win by telephone contact with the game show, and verifying that they were watching the game show. Prizes are awarded to all winners.

BRIEF DESCRIPTION OF THE DRAWINGS

With the above and additional objects and advantages in view, as will hereinafter appear, this invention comprises the devices, procedures, combinations and arrangements of parts hereinafter described by way of example and illustrated in the accompanying drawings of preferred embodiments in which.

In the various figures of the drawings, like reference characters designate like parts.

DESCRIPTION OF THE PREFERRED EMBODIMENTS

Figure 1:
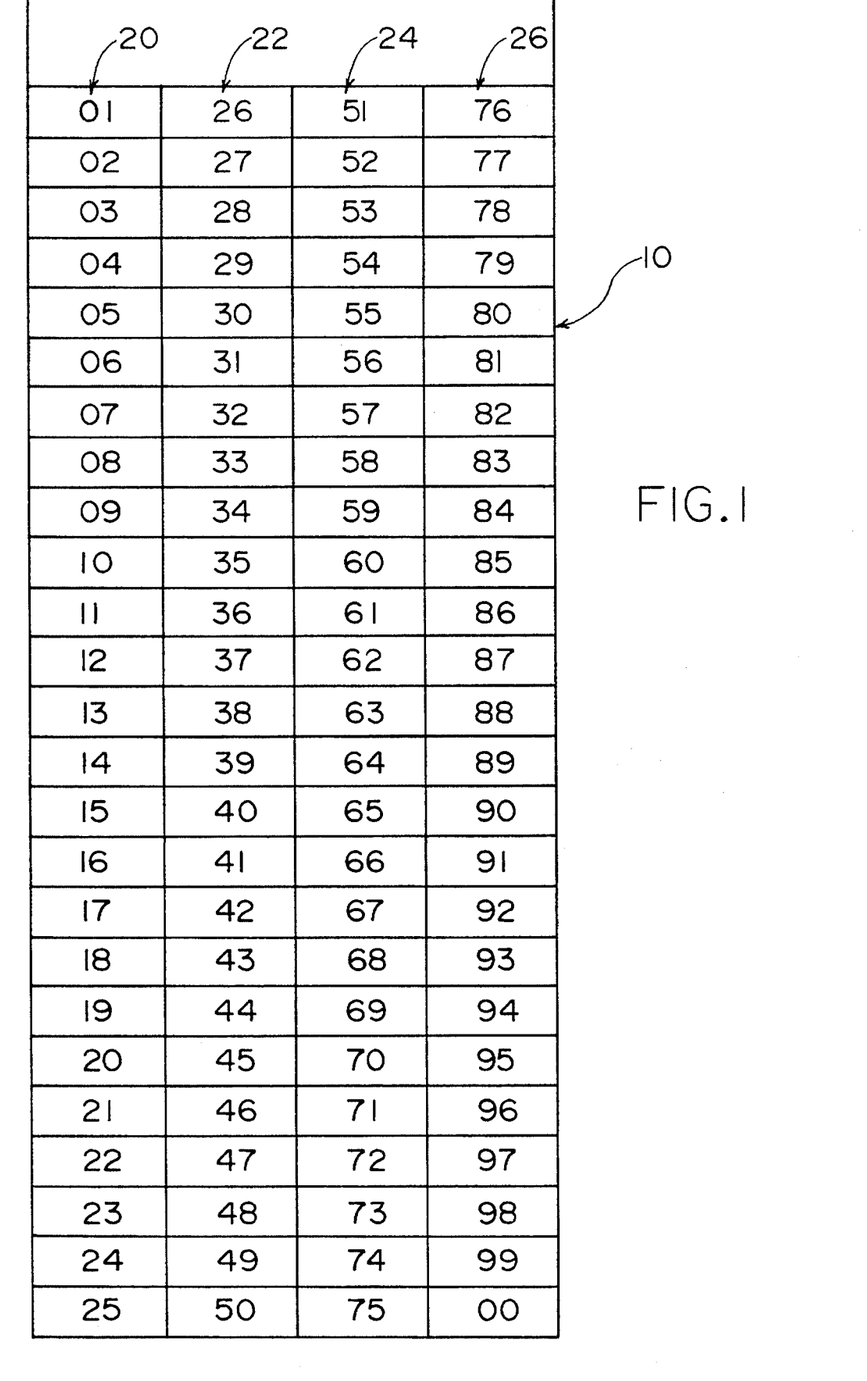
FIG. 1 is a front view of a master board for playing the game in accordance with the present invention.

In accordance with the present invention, a television game show is interactively played by the studio participant game players, the television studio audience and by telephone with the television-viewing home audience, where a collection or set of numbers are disposed on a master board 10 preferably positioned on the studio stage, as shown in FIG. 1, where the numbers in the set belong to a specified portion of the telephone numbers of the television-viewing home audience. As is well known, telephone numbers in the United States consist of ten digits, being arranged into three main parts, the first part being the area code consisting of three digits, then the second part being the exchange or prefix number consisting of three digits, and finally the third part being the station number consisting of the last four digits. The numbers on the master board 10 will correspond to a designated part of the telephone number. Accordingly, the numbers on the master board 10, that is the population of numbers from which numbers will be randomly selected to construct the game boards, will be randomly selected during the playing of the game, as set forth below. All those numbers on the master board and the game boards to a specific portion of the telephone numbers of the television-viewing home audience.

Thus, the numbers on the master board 10 to define the population could be all the area codes, or all the prefixes, or only the first two or last two digits of all the prefixes, or only the first two or last two digits of all the station numbers of the telephone numbers of the television-viewing home audience. Preferably the numbers include at least two digits. For example, if it is determined to use only the last two digits of the station numbers of the television-viewing home audience, and one of the television-viewing home audience has a telephone number consisting of (718) 643-0445, then only the last two digits 45 of the station number of this telephone number would be designated on the master board 10.

Accordingly, the master board 10 shown in FIG. 1 includes only the last two digits of the station number of the telephone numbers of the television-viewing home audience.

With a large television-viewing home audience, the the probability is that all the numbers from 01 (the lowest number) to 00 (the highest number) as shown on the master board 10, would be covered by the last two digits of the station number of the telephone numbers of all the television-viewing home audience. Obviously, most if not all of each of these numbers would represent more than one television-viewing home audience household, where each household would be eligible to win as set forth below. Accordingly, in order to be eligible to win, each television-viewing home audience household must either telephone the game show or must be registered with the game show so that the game show can telephone the household, as set forth below.

Figure 2:
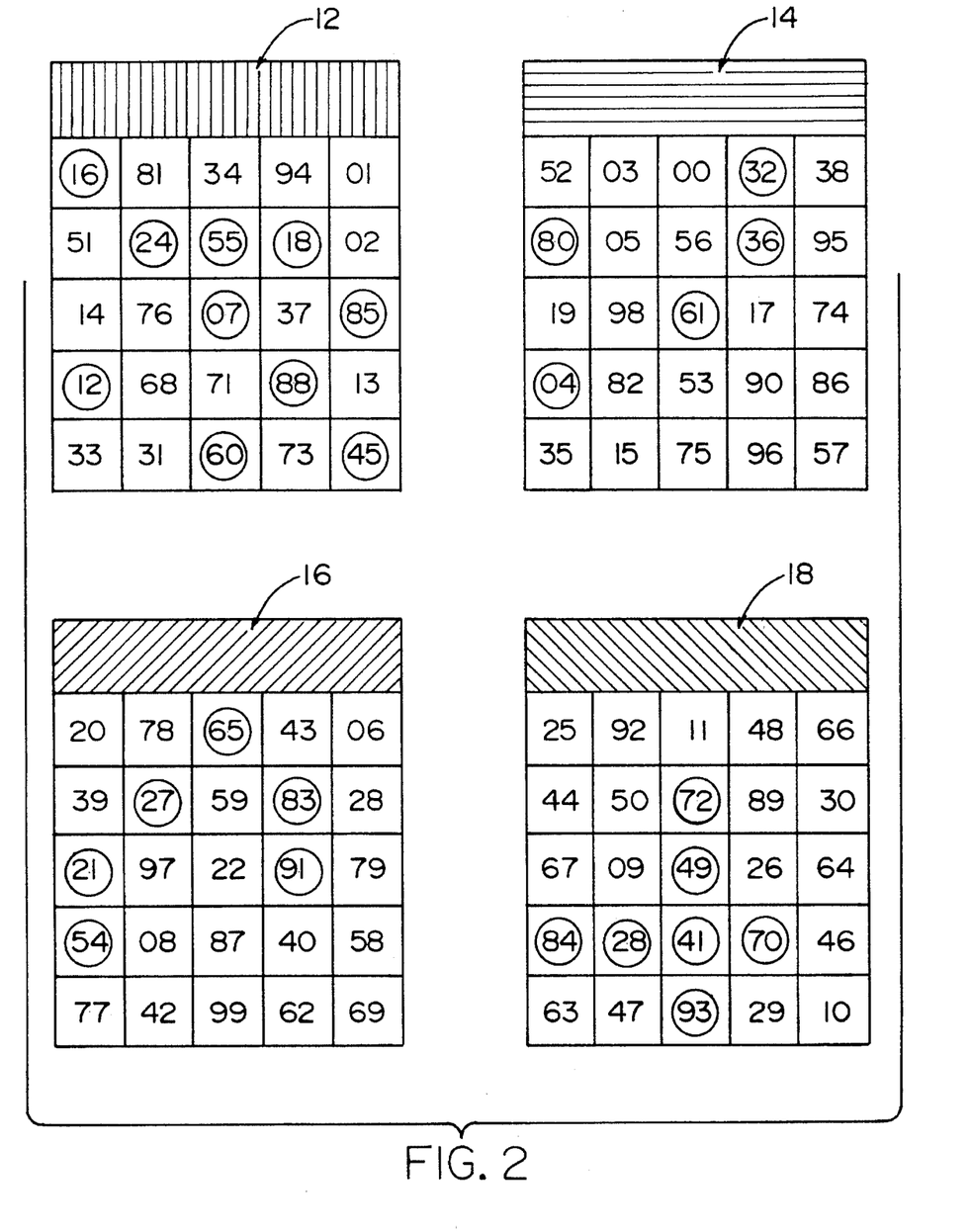
FIG. 2 is a front view of game boards for playing the game in accordance with the present invention.

In the playing of the game, game boards are used. Each game board includes a matrix. The game boards could be of several sizes, each with an equal number of rows and columns, such as three by three, four by four, five by five or the like. For example, one game board matrix could be of five rows and five columns to provide twenty-five squares, each square containing a number corresponding to a number on the master board 10. These game board numbers for each game board are randomly assigned in a manner well known in the art. Accordingly, in order to have all the home audience participate in the game, all the numbers on the master board 10 must be assigned to the game boards being played. Thus, with the master board 10 as shown in FIG. 1 having one hundred numbers, the minimum number of five by five game boards being played is four. Obviously, if it is desired to have more than four game boards, then some of the numbers on the master board 10 can appear on more than one game board, so that the number of game boards is unlimited within reason. FIG. 2 shows four game boards 12, 14, 16 and 18 with the one hundred numbers of the master board 10 randomly disposed on the four game boards, where obviously additional game boards may be used as set forth above.

Accordingly, the numbers on the master board 10 are selected by chance, one at a time, such as by picking numbers from a drum containing all the numbers as in the prior art bingo game, by a computer system well known in the art, and the like, and then the selected number is indicated in the square of the game board having that particular number.

In a modified procedure, more than one number can be selected from the master board 10 at one time, in order to make the game progress faster so that the game conforms to the time constraints of a specific broadcast time slot. Additionally, to maximize the competition, when more than one number is selected at one time, an equal number is selected for each game board. For example, one or more numbers could be selected from each of the four columns 20, 22, 24 and 26 of the master board 10 at one time, where if desired, each column 20, 22, 24 and 26 can form its own master board.

Figure 3:
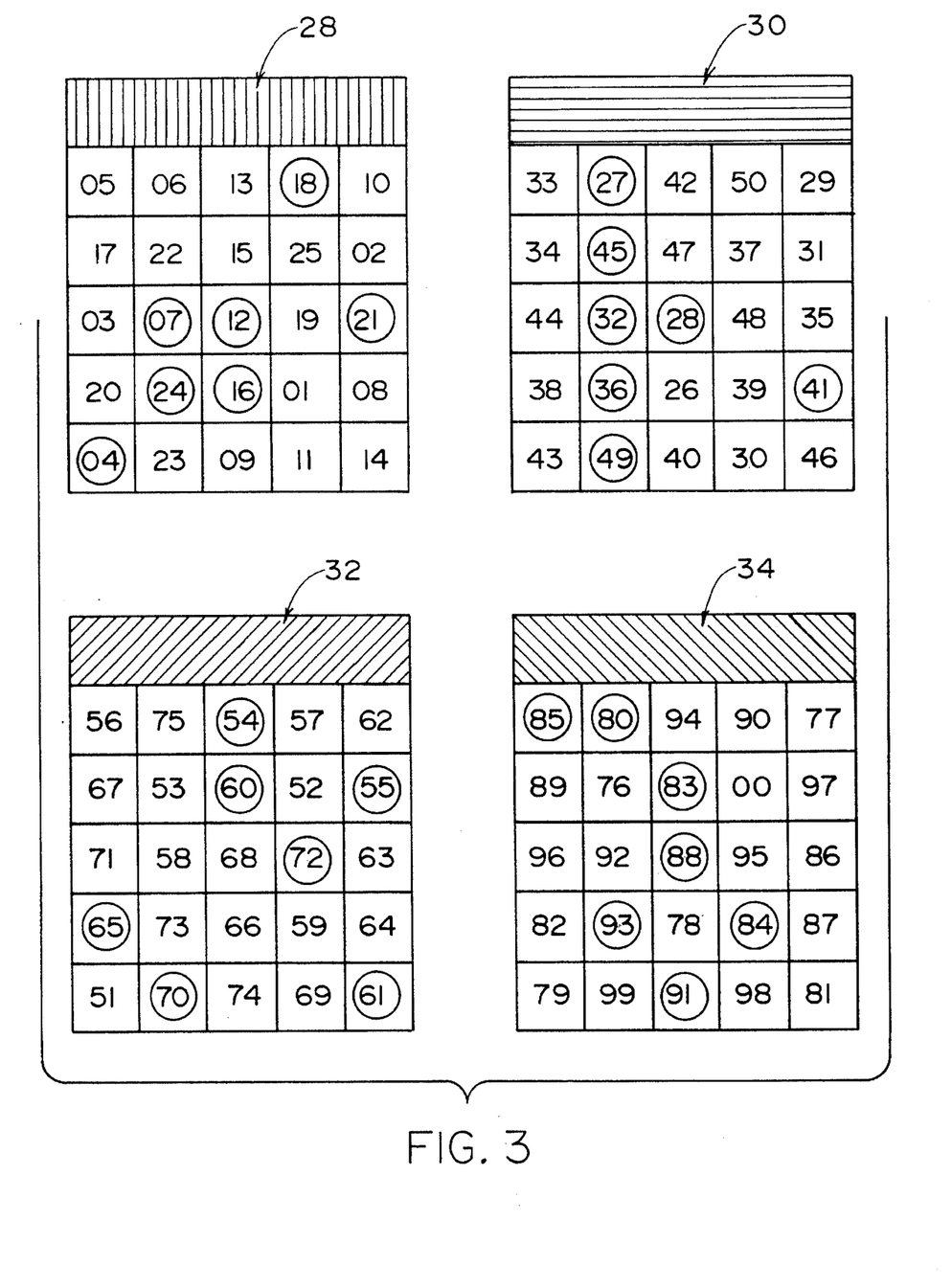
FIG. 3 is a front view of modified game boards.

Accordingly, in order to ensure that a number is selected on each game board at each selection, the random assignment of the numbers forming each game board must be changed. FIG. 3 shows four game boards 28, 30, 32, 34 containing all the one hundred numbers of the master board 10. However, the numbers for game board 28 are randomly assigned only from those numbers in column 20 of the master board 10, thus being limited to the numbers 01 to 25.

Likewise, the game board 30 is randomly assigned from the numbers 26 to 50 in column 26, the game board 32 is randomly selected from the numbers 51 to 75 of column 24, and the game board 34 is randomly selected from the numbers 76 to 00 in column 26 of the master board 10.

The numbers on the master board 10 can be selected in other ways, as will be set forth below when the game show has studio participant game players. Furthermore, for reasons set forth below, each of the game boards 12, 14, 16, 18 or 28, 30, 32, 34 is specifically labelled or otherwise designated, for example, by a name, a number, a color, a position, a letter or the like. As shown in FIGS. 2 and 3, the game boards 12 and 28 are designated by the color red, the game boards 14 and 30 are designated by the color blue, the game boards 16 and 32 are designated by the color brown, and the game boards 18 and 34 are designated by the color green.

The game is finished when one of the game boards registers a win, the win being defined by five of the selected numbers in five squares on one game board forming a consecutive horizontal, vertical or diagonal line of squares. Obviously, in the modified process when more than one number is being selected from the master board 10 at one time, it is possible that two or more of the game boards have a winning line of squares at the same time, where a discussion of the outcome of this situation is set forth below.

Though the television game show of the present invention is arranged to be interactively played with the studio participant game players, the television studio audience and the television-viewing home audience, it is obvious that the television game show can be played with only the television-viewing home audience, which will now be described below. The television game show played additionally with the studio participant game players and the television studio audience will be set forth later below.

In order for a household member of the television-viewing home audience to win, the household member is required to pass a three step procedure. The first step requires the household member to become eligible to win. In order to be eligible, the designated portion of the telephone number of the household member must match any one of the five numbers contained in the winning horizontal, vertical or diagonal line of squares on the winning game board. For example, using the last two digits of the station number as the designated portion of the telephone number, as indicated above for the game boards 12, 14, 16, 18 shown in FIG. 2, the household member having a telephone number consisting of (718) 643-0445, would be playing with the last two digits 45 of the station number of his or her telephone number. Thus, if the game board 12 is the winning game board with a winning diagonal line of five selected numbers 16, 24, 7, 88 and 45, where the numbers selected from the master board 10 are circled on each of the game boards 12, 14, 16, 18, then this particular household member having the last two digits 45 becomes eligible to win.

Likewise, in the modified procedure using the four game boards 28, 30, 32, 34 shown in FIG. 3, when four numbers are simultaneously selected from the master board 10, one number being selected from each of the four columns 20, 22, 24, 26 thereof, the game board 30 having the winning vertical line of the numbers 27, 45, 32, 36, 49 is the winning game board. It is noted that again the numbers selected from the master board 10 are circled on each of the game boards 28, 30, 32, 34. Thus, likewise, the household member having the above telephone number is also eligible to win in that the last two digits of the station number of his or her telephone number is 45 which is contained in the winning vertical line.

It is noted, that should any one of the game board 12, 14, 16, 18 or 28, 30, 32, 34 have more than one winning line, such as a winning vertical line which crosses a winning horizontal or diagonal line, or should two or more of the game boards 28, 30, 32, 34 have a winning horizontal, vertical or diagonal line at the same time, then all the household members having a number in any of the above-mentioned winning horizontal, vertical and diagonal lines would be eligible to win, unless of course the rules of the game show specify otherwise. Such rules could specify that a winning horizontal line dominates over a winning vertical line, and a winning vertical line dominates over a winning diagonal line, or that a designated red game board dominates over a designated blue game board, which in turn domiantes over a brown game board, which dominates over a green game board. Obviously, the domination of one winning line over another winning line, and the domination of one designated colored board over another designated colored board could be determined by chance before the game begins.

The second step includes telephone contact between the eligible to win household member and the game show, which can be performed by either or both of two methods determined in advance by the game show.

The first method requires the eligible to win household member to telephone the game show by dialing a specific game show telephone number. The game show determines, before the game, the number of winners for each game, and selects either specifically or randomly the winners by the order of their calls. For example, the game show can decide that a particular game will have ten winners, and that the first ten qualified persons that call will be the winners. In another game, the game show can decide that there will be only eight winners, and that the eleventh through eighteenth qualified callers would be the winners.

In the second method, the game show can require that the telephone-viewing home audience register their home telephone numbers with the game show prior to the game show telecast. The registration can be done by letter, postcard, telephone and the like prior to the game show telecast. The registered telephone numbers are then entered into a game show computer telephone number data bank. At the completion of each game, the game show computer will randomly select a specified number of registered telephone numbers that qualify as being eligible to win. The game show personnel will then telephone the randomly selected, eligible to win registered telephone numbers, to inform the selected registered telephone-viewing home audience that they have won.

The third step is a verification procedure where each eligible to win household member must provide proof that he or she was watching the game show. This proof can be accomplished by having the household member indicate which of the game boards won the game, such as by indicating the winning game board by its designated color or any other designated predetermined labelling or designation thereof determined by the game show. Additionally, in the above first method in which the household member telephones the game show, the household member must verify his home telephone number. This verification can be accomplished by having the game show personnel telephone the household member at their home telephone number. However, it is noted, that in many parts of the United States, telephone devices are permitted to be attached to the telephones which indicates the telephone number of all incoming telephone calls. With such a telephone device, the game show personnel can themselves verify whether or not the household member making the telephone call has an eligible to win telephone number, so that all the household member needs to do is indicate which game board won the game, as indicated above.

Accordingly, all the winning household members of the television-viewing home audience that have won, as determined by the above procedures, will be awarded prizes in the form of merchandise, services or cash, which preferably is announced to the household members prior to the playing of the game. If a cash prize is awarded, the dollar amount of each cash prize can be determined in any one of several ways. For example, a dollar amount (being all different, being all the same, or only some being the same) can be assigned to each occupied square on the winning line of the winning game board, so that the total dollar amount thereof would determine the cash prize, or the same dollar amount can be specified for each occupied square on the winning game board, and this latter dollar amount would be multiplied by the number of squares occupied on the winning game board to determine the cash prize. Another method would be to total the numeric values contained in the five squares of the winning line on the game board, and then convert this total value to dollars to determine the cash prize. Obviously, the cash prize could be a specified amount determined by the game show.

To heighten the excitement of the game, any game could become a double or triple game, when during the playing of the game, a double or triple designator is selected by chance, at the beginning of play or in the course of the game during the square selection procedure. Thus, a double prize would be awarded to each winning household member when a double game is played. Likewise, a triple prize would be awarded to each winning household member when a triple game is played.

Furthermore, a pyramid-type prize award system can be employed. For example, the pyramid-type system could be keyed to the months of the year, where a numeric value is assigned to each month as a multiplier of the winning cash prize. Thus, January as the first month of the year can have a multiplier value of one, February a multiplier value of two, and so on through December which can have a multiplier value of twelve. Accordingly, a cash prize for all games played in a given month, as determined by a standard prize awarding procedure, such as mentioned above, would be multiplied by the appropriate multiplier value for that particular given month in order to arrive at the total winnings for each game for each winning household member.

As an additional feature for each game, a certain percentage, preferably up to fifty percent, of the squares on the game board can be designated as "lucky squares", where these "lucky squares" would be randomly selected for each game board. Thus, when the number in the "lucky square" is selected from the master board, this number in the "lucky square" immediately is designated a winning number for any household member having this number in the predetermined portion of their telephone number, where it is not necessary to complete a winning horizontal, vertical or diagonal line of squares on the game board. Thus, the household members having the number designated in the "lucky square" automatically become eligible to win without waiting for the game to be won. Accordingly, the above procedure for household members eligible to win is now followed.

Thus, as indicated above, the television-viewing home audience includes all individuals viewing the game show on their home television sets. The game show allows a predetermined portion of the household members of the television-viewing home audience to win. In addition, the winning household members will win in "real time" that is they will win as the game show is being televised. The game is open to all household members who wish to participate, where winning is determined by a mixture of the actions, the initiative, and the luck of the household member, such as the action of dialing of the telephone, and/or the initiative of registering their home telephone numbers with the game show, and the luck in the playing of the game.

Moreover, the specific household members that will win is not preprogramed or predetermined in any way by the members of the staff of the game show, nor is winning restricted to a single household member of the telvision-viewing home audience. Thus, the interaction with the television-viewing home audience is employed by using two mediums, namely television and telephone. Television is a one way channel of communication, but the telephone is employed in the playing of the game, will allow a two way interaction and communication with the household members of the television-viewing audience, as indicated above.

Though as stated above, the television game show of the present invention can be played with only the television-viewing home audience, for greater interest therein, it is preferred that the television game show be interactively played with at least both the studio participant game players and the television-viewing home audience, as will now be described below. The television game show played additionally with the television studio audience will be set forth later below.

The participant game players are those players of the game who are on the television studio stage, who directly interact with the game show host, and who directly play the game. There can be two or more studio participant game players, each of which is assigned at least one individual game board to play. For example, if there are two game players, then each will be assigned two of the game boards 12, 14, 16, 18 or 28, 30, 32, 34, so that the entire television-viewing home audience, represented on the master board 10 by the one hundred numbers thereon, are included in the game. Likewise, if there are three game players, each will also receive two game boards so that there would be six game boards in total which are prepared from the master board 10 in the manner mentioned above in which a number from the master board 10 can be designated on more than one game board. Preferably, it is desired to have four game players with each game player having one of the game boards 12, 14, 16, 18 or 28, 30, 32, 34. Obviously, the number of game players is unlimited within reason. One of the game players wins when he or she is the first to have five squares on his or her game board that form a consecutive horizontal, vertical or diagonal line of squares, as indicated above, and as will be more fully described below.

There are many different ways in which a game player can be awarded a square on his game board. As mentioned above, the numbers from the master board 10 can be selected by chance, one or more numbers at a time, or in sets of two or more numbers. Then the selected number or numbers are indicated in the square or squares of the game boards 12, 14, 16, 18 having the selected number or numbers. In the modified procedure as mentioned above, more than one number can be selected from the master board 10 at one time, preferably one number from each of the four columns 20, 22, 24, 26 at the same time, so that one of the selected numbers will be indicated in a square of each of the game boards 28, 30, 32, 34 having that particular number. Where in the case of four game players, each game player will have one of the four game boards 28, 30, 32, 34. In this latter modified procedure, each of the game players can participate in the random selection of the numbers, such as by spinning a wheel having his particular numbers thereon or by pressing a button or pulling a handle associated with a computer system for randomly selecting his particular numbers.

It is noted, that the numbers on the master board 10 can be selected with or without replacement thereof. For example, in the with replacement case, when the game player actively participates in the random selection of the number as indicated above, then the selected number will only be awarded to the game board of the game player making the selection, and therefore the game boards of the other game players having that particilar selected number thereon cannot be awarded that particular number. Alternately, in the without replacement case, the number selected from the master board 10 can be assigned to the square on all the game boards having that particular number. Preferably, the selected number on the master board 10 will light up, and stay on in the without replacement case, but will go out in the with replacement case. Accordingly, when the numbers are selected with replacement, the selected number is only awarded to the square of the game board being played by the game player who made the selection, where the other game players having that particular number on their game boards would have to select that particular number on their own.

Figure 4:
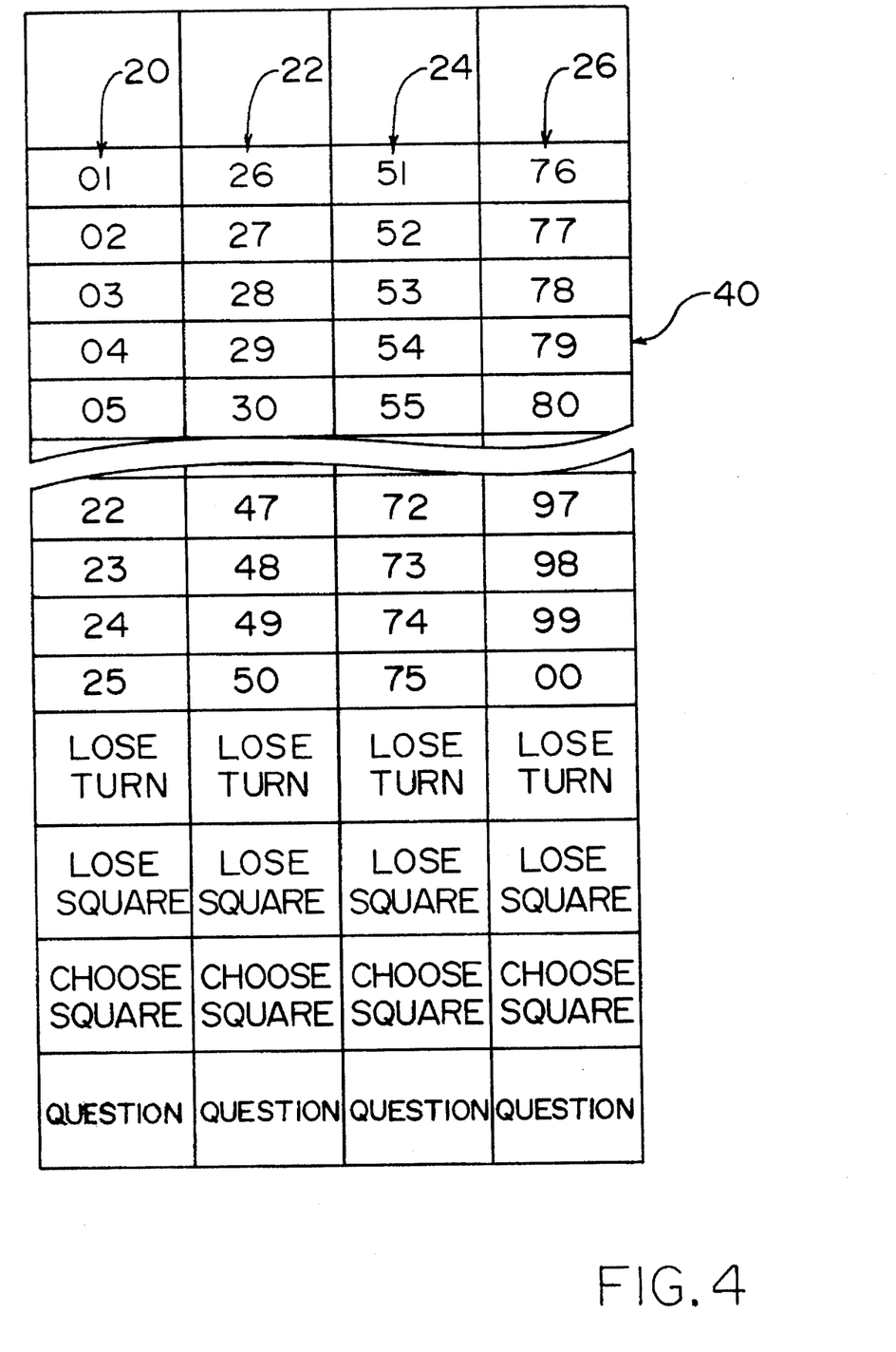
FIG. 4 is a fragmented front view of a modified master board.

FIG. 4 shows a modified game board 40 including additional choices thereon together with the numbers, which can be randomly selected for each of the game players. These choices could include "lose turn", "lose square", "choose square", "question" and the like. Accordingly, when the game player is awarded one of these choices, he or she will have to perform the selected choice. For example, if "lose turn" is randomly selected, then the game player would not be awarded any number in that round of selections. If "lose square" is randomly selected, then the game player would have to give up one of the squares on his or her game board that has already been assigned a selected number. If "choose square" is randomly selected, then the game player can select any one of the squares on his or her game board to be awarded the number therein. If "question" is randomly selected, then the game host would ask the game player a question. If the game player correctly answers the question, he or she can be awarded any square on his or her game board he or she selects. If he or she answers the question wrong, then he or she would lose a square already awarded on his or her game board, where the selection of which square is to be lost can be made by the game player or another game player depending upon the rules determined before the start of the game.

However, the preferred way in which a game player can be awarded a square on his game board is for the game player to correctly answer a question given by the game host, which can have several variations. Accordingly, in each variation, one number on the master board must be specifically selected by the game player, after which the game player must correctly answer the question before being awarded the selected number on his or her game board. If the question is incorrectly answswered, the selected number is not awarded and remains available on the master board.

The game show determines which game player has the first opportunity to select a specific number on the game board, and the order of selection for the remaining game players. For example, each game player can be asked a question in a predetermined order, one game player at a time in his or her turn. Alternately, the game host can ask one question for all the game players, and the first to respond, such as by ringing in, and answering the question correctly is awarded the number he selected to be designated on his or her game board. Obviously, there are other procedures that specify which game player has the opportunity to select a number from the master board.

In a variation of the game, the game player can be restricted as to which numbers he or she can select from the master board. For example, after a game player selects his or her first number from the master board and is awarded that number on his game board by correctly answering a question, the game player can then be restricted to only selecting a number that is in a square of his or her game board directly in contact with the number or numbers that have already been awarded to his or her game board. Thus, if the game player is playing game board 12 shown in FIG. 2, and has already been awarded the middle square containing the number 07 therein, then the player for his next selection can only select one of the numbers 24, 55, 18, 76, 37, 68, 71, 88 that is in a square of his or her game board directly in contact with the square containing the number 07.

As indicated above, the first game player to have five awarded squares on his or her game board that form a consecutive horizontal, vertical or diagonal line of squares, is the winner of the game. Accordingly, in the case where the same number or numbers are on more than one game board, so that it is possible to have more than one winning game board, both of the game players having a winning game board can be winners. Alternatively, the winner can be chosen by the game host asking another question to each of the game players having the winning game boards, where the game player with the correct answer would be the winner, all of which is decided by the game show prior to the playing of the game. Obviously, the eligible to win household members of the television-viewing home audience can be determined in the same manner, where the eligible to win household members must have the numbers in the winning line on the winning game board of the winning game player or players.

Accordingly, the winning studio participant game player wins a prize in the form of merchandise, services, and/or cash. The cash prize, for example, could be a specific dollar amount, could be a dollar amount determined by the number of occupied squares on the winning game player's game board, could be a dollar amount determined by the sum of the numeric values contained in the five squares forming the winning line, or could be a combination and/or variation thereof. Furthermore, the cash prize could be determined in the same manner mentioned above for the winning household member of the television-viewing home audience.

Obviously, for the greatest interest in the television game show, it is preferred that the television studio audience be involved in the game to heighten the excitement thereof, and to add to the entertainment value of the game show for the television viewing audience. Accordingly, the television game show played additionally with the television studio audience will now be set forth below.

Preferably, all the individuals in the television studio audience participate in the game show, and are eligible to win a prize. Each of the studio audience members are assigned to one or more of the game boards being played by the game players on the studio stage. Preferably, each game board is assigned to approximately an equal number of studio audience members. When one of the game boards wins, all the studio audience members that were assigned to that winning game board also win. For example, each studio audience member can be assigned one of the game boards 12, 14, 16, 18 or 28, 30, 32, 34 by color, and would be sealed in a colored section of the studio relating to the assigned color. Thus, those studio audience members assigned to the game board 12 or 28 would be seated in the red section, those assigned to the game boards 24 or 30 would be seated in the blue section, those assigned to the game boards 16 or 32 would be seated in the brown section, and those assigned to the game boards 18 or 34 would be seated in the green section of the studio. Accordingly, each winning studio audience member will win a prize in the form of merchandise, services or cash determined by the game show before the playing of each game.

Thus, as indicated above, the television game show of the present invention is interactive with three different groups of players, the studio participating game players, the television studio audience, and the television-viewing home audience, where the television-viewing home audience participates through the two-way interactive use of the telephone. Accordingly, the format of the television game permits members of each participating group of players to be winners and be awarded prizes which are determined before the playing of each game.

Numerous alterations of the format, the playing of the television game, and the structures herein discussed will suggest themselves to those skilled in the art. However, it is to be understood that the present disclosure relates to preferred embodiments of the invention which are for purposes of illustration only, and are not to be considered as a limitation of the invention.

What is claimed is:

1. A method of playing a game on a television show comprising:

preparing a set of numbers corresponding to a specified portion of telephone numbers of a television-viewing home audience;

preparing a predetermined number of game boards, each game board including a matrix having an equal number of rows and columns to provide an arrangement of squares with each square containing a numbers, assigned by chance, corresponding to a numbers from said set;

displaying the game boards on television for viewing by the home audience;

selecting numbers from said set and indicating each selected numbers in the square of the game board having the selected numbers thereon;

finishing the game when one of the game boards registers a win by having a consecutive horizontal, vertical or diagonal line of squares containing selected numbers therein;

determining which members of the home audience are eligible to win by having any one of the selected numbers in a winning line of squares; and making interactive telephone contact between a portion of eligible to win members of the home audience and staff members of the television show to award all winning members of the home audience.

2. A method according to claim 1, wherein the step of selecting numbers from said set includes randomly selecting numbers by chance.

3. A method according to claim 1, wherein the step of preparing the predetermined numbers of game boards includes assigning all numbers from said set to the game boards so that every member of the home audience has a numbers on at least one game board corresponding to a specified portion of his or her telephone numbers.

4. A method according to claim 1, including members of the home audience registering their telephone numbers with the television show prior to the game in order to play the game.

5. A method according to claim 4, including the staff members of the television show telephoning a randomly selected numbers of the registered telephone numbers of said portion of the eligible to win members of the home audience.

6. A method according to claim 5, including every eligible to win member, to whom a telephone call was made, verifying that he or she was watching the game on television.

7. A method according to claim 1, including the eligible to win members of the home audience telephoning the staff members of the television show in order to be a winning member.

8. A method according to claim 7, including every eligible to win member, who completed a telephone call, verifying his or her telephone numbers, and verifying that he or she was watching the game on television.

9. A method according to claim 1, including specifically designating the game boards differently from each other so that each game board can be separately identified in order for the home audience to verify that they were watching the game on the television by naming the winning game board.

10. A method according to claim 1, including selecting the numbers from said set one at a time.

11. A method according to claim 1, including selecting more than one numbers from said set at one time.

12. A method according to claim 1, including indicating selected squares on each game board as instant winners so that any member of the home audience having numbers in a selected square as a portion of his or her telephone numbers is eligible to win when numbers in the selected square is selected from said set.

13. A method according to claim 1, including playing the game with studio participant game players, assigning at least one game board to each game player, first game player having the winning line of squares on his or her game board being a winner of the game.

14. A method according to claim 13, wherein the step of selecting numbers from said set includes randomly selecting numbers by chance.

15. A method according to claim 13, wherein the step of selecting numbers from said set includes a game host asking questions to the game players, a selected numbers being indicated on the game board of the game player who correctly answers a question.

16. A method according to claim 15, including asking questions one at a time to each game player in turn.

17. A method according to claim 15, including asking questions one at a time to all the game players, first game player to correctly answer a question selects a numbers from said set which is then indicated on his or her game board.

18. A method according to claim 15, including the game player, who correctly answers a question, selecting a numbers from said set which is then indicated on his or her game board.

19. A method according to claim 13, including providing said set with additional indicators which can be randomly selected for each of the game players, the additional indicators including indications that the game player lose a turn, lose a square, choose a square, answer a question.

20. A method according to claim 13, including playing the game also with a television studio audience, assigning at least one game board, which is being played by the game players, to each member of the television studio audience, where all members of the studio audience assigned a winning game board are winners.

\* \* \* \* \*